No. 733,538. PATENTED JULY 14, 1903.
D. BURNETT.
APPARATUS FOR MEASURING ILLUMINATION.
APPLICATION FILED NOV. 14, 1902.
NO MODEL.

Witnesses
Inventor
D. Burnett
By his Attorney
Edward P. Thompson

No. 733,538. Patented July 14, 1903.

UNITED STATES PATENT OFFICE.

DOUGLASS BURNETT, OF BROOKLYN, NEW YORK.

APPARATUS FOR MEASURING ILLUMINATION.

SPECIFICATION forming part of Letters Patent No. 733,538, dated July 14, 1903.

Application filed November 14, 1902. Serial No. 131,433. (No model.)

*To all whom it may concern:*

Be it known that I, DOUGLASS BURNETT, a citizen of the United States of America, and a resident of the borough of Brooklyn, in the county of Kings and State of New York, have invented certain new and useful Improvements in Apparatus for Measuring Illumination, of which the following is a specification.

My invention, as herein set forth, relates to apparatus for measuring the amount of general lighting as distinguished from the measurement of the intensity of the light of an individual lamp or source of light. As an illustration, a room may be illuminated by several lamps of different candle-powers and of different kinds and located at various parts of the room. The problem I have solved is independent of the measuring of the candle-power of any one or more of the lamps. I secure the direct measurement or indication of the amount of light in any part of the room.

The particular apparatus herein described for carrying out the invention consists of an eye-box and lamp-box, a standard lamp movable to and fro in the lamp-box, a photometer-screen located in the line of sight of the eye-box and also facing said lamp, and a second similar screen in the line of sight of the eye-box and facing also the outside light.

More specifically the apparatus consists of the combination of sources of light, light-diffusing objects, a fixed photometer-screen exposed to the light from said sources and from the light-diffusing objects, a movable standard lamp, a second fixed photometer-screen in the path of the direct rays from said standard lamp and cut off from the diffused light and from the light from the first-named sources of light or lamps, and an eye-box directed toward both of the photometer-screens, an opaque box or lamp-box inclosing said standard lamp and having a slot, and a handle on the outside of the last-named box and extending through said slot for supporting said standard lamp.

The device embodying the invention is described in detail in the accompanying drawings.

Figure 1:
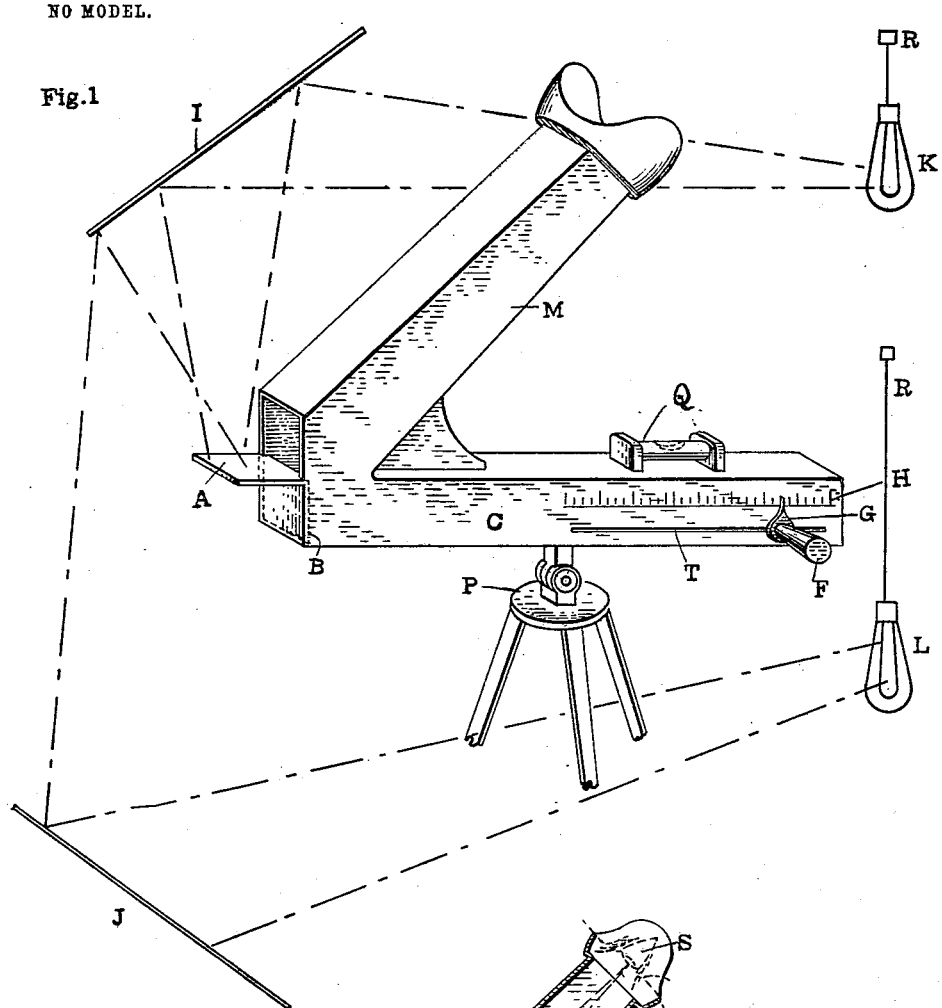
Figure 2:
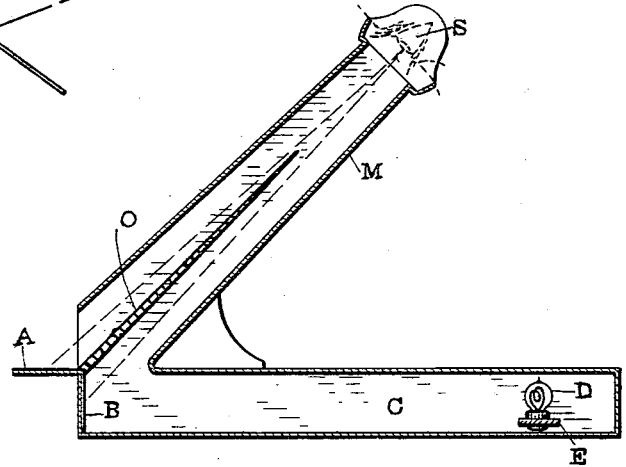

Figure 1 is a perspective view of the device and such apparatus as is necessary for explaining the nature of the operation. Fig. 2 is a sectional view of the device, embodying a modification.

A is a photometer-screen, and B is another photometer-screen, the two being shown at right angles to each other and located the latter across the end of the lamp-box C, containing a standard lamp D, carried by a movable support E inside the box C and having a handle F on the outside of the box C and an indicator carried by the handle for pointing out the location of the lamp with respect to the scale H on the outside of the box C. This scale enables one to read the number of luces illuminating the screen A, which faces the general lighting, such as the objects or walls of a room or lamps contained therein. Such objects are typically represented by diffusing-screens I and J for the lamps K and L. The screen A stands at the open end of the eye-box M in the line of sight of an observer looking into the other end of the eye-box M. When one looks into the eye-box M, he sees simultaneously the photometer-screens A and B, which should preferably be white, while the internal walls of the tubes M and C should be black, all for obvious reasons.

It is preferable to provide an opaque screen O, extending into the eye-box from the juncture of the screens A and B, to prevent the outside light from entering the box C, and thereby interfering with the efficiency of the instrument.

The operation consists in placing the device so that ordinary light, the amount of which is sought to be determined, shall fall upon the screen A. The operator places his eyes at the upper end of the box M and looks simultaneously at the screens A and B and then moves the handle F back and forth until the luminosity of the screens A and B appears uniform. He then reads the scale H, and thereby knows the number of luces on the screen A. The lux is, as well known among those skilled in the art, the at present accepted unit of illumination, being the amount of illumination received by a surface illuminated by a light of one-candle power at a distance of one foot, and the number of luces of illumination of any illuminated surface being the candle-power of a light at a distance of one foot necessary to produce an equal illumination of said surface. To obtain an average, if desired the device may be turned in different directions on the tripod T and readings taken as before. Accordingly the instrument may be employed in meteorology or for scientific purposes. For example, it may be so located that the screen A faces the sky and out of direct sunlight, and thereby the luminosity of the sky on different days and under variations of the weather may be determined. Similarly the lighting effect of the sun itself may be determined.

A spirit-level Q may be applied to the instrument for convenience in cases where it is desirable that the lamp D may be movable in a horizontal plane.

R represents supports for the lamps K and L. The screens A and B are shown at an angle to each other, and the opaque screen O extends from the juncture of the photometer-screens A and B. It is found that when one looks into the box M the screen O will remain practically unnoticed, while both of the screens will be distinctly visible, and any difference in their luminosity will be easily discernible.

T represents a slot through one side of the box C, so that the handle F may pass through the slot and support the lamp D.

The elements I and J are light-diffusing objects and are stationary and are supposed to be so located as to directly or indirectly reflect more or less of the light from the lamps K and L to the screen A. They may either represent the walls of a room or stationary objects in the room or they may be provided as a portion of the apparatus and may be placed at different relative positions and angles with respect to the screen A.

As arranged in the drawings the eye and lamp boxes M and C serve to cut off the light of the lamps K and L from the screen A in cases where only diffused light is to be measured.

I claim as my invention—

1. An apparatus for measuring illumination by diffused light comprising a pair of comparison-screens, one of which is freely exposed on all sides to diffused light, a lamp-box inclosing the other screen, a standard source of light movable longitudinally in said box, and an eye-tube through which both screens may be seen simultaneously.

2. An apparatus for measuring illumination by diffused light comprising a pair of comparison-screens, one of which is freely exposed on all sides to diffused light, a lamp-box inclosing the other screen, a standard source of light movable longitudinally in said box, and an eye-tube through which both screens may be seen simultaneously, said screens making an equal angle with the axis of said eye-tube.

3. An apparatus for measuring illumination by diffused light comprising a pair of comparison-screens, one of which is freely exposed on all sides to diffused light, a lamp-box inclosing the other screen, a standard source of light movable longitudinally in said box, an eye-tube through which both screens may be seen simultaneously, and a graduated scale connected with said standard source of light for indicating the number of luces of illumination of the second-named screen.

4. A photometer consisting of the combination of two photometer-screens arranged at an angle to each other, an eye-box arranged to view both screens, so that said screens are in the line of sight of an observer looking into said box, a lamp-box extending from one of said screens, a lamp in the latter box and movable to and fro in the same, and an opaque screen extending from the juncture of the two photometer-screens into the eye-box.

5. Apparatus for measuring illumination, consisting of the combination of supports for the lights producing said illumination, diffusing objects for diffusing the rays from said lights, a photometer-screen cut off from said lights and exposed to the diffused light from said light-diffusing objects, a movable support for a standard light, a photometer-screen cut off from said diffused light and exposed to said standard light, and an eye-box directed toward both of said screens.

6. Apparatus for measuring illumination, consisting of the combination of supports for the lights producing illumination, diffusing objects for diffusing the rays from said lights, a screen exposed to the diffused light from said light-diffusing objects, a movable support for a standard light, a photometer-screen cut off from said diffused light and exposed to said standard light, an eye-box directed toward both of said screens, and an indicator controlled by the movement of said standard light, for indicating the number of luces in said diffused light.

7. Apparatus for measuring illumination, consisting of the combination of supports for the lights producing said illumination, diffusing objects for diffusing the rays from said lights, a photometer-screen cut off from said lights and exposed to the diffused light from said light-diffusing objects, a movable support for a standard light, a photometer-screen cut off from said diffused light and exposed to said standard light, an eye-tube directed toward both of said screens, an indicator controlled by the movement of said standard light, for indicating the number of luces of said diffused light, and an opaque screen for preventing the light intended for one photometer-screen from falling upon the other photometer-screen.

8. Apparatus for measuring illumination, consisting of the combination of stationary sources of light, stationary light-diffusing objects, a fixed photometer-screen exposed to the diffused light from said stationary light-diffusing objects, and cut off from said lights as to direct illumination, a movable standard light, a second fixed photometer-screen in the path of the direct rays from said standard light and cut off from the diffused light and the direct light from the first-named stationary lights, and an eye-box directed toward both of the photometer-screens.

9. Apparatus for measuring illumination, consisting of the combination of stationary sources of light, stationary light-diffusing objects, a fixed photometer-screen exposed to the diffused light from said stationary light-diffusing objects, and cut off from said lights as to direct illuminations, a movable standard light, a second fixed photometer-screen in the path of the direct rays from said standard light and cut off from the diffused light and the direct light from the first-named stationary lights, an eye-box directed toward both of the photometer-screens, an opaque box inclosing said standard light and having a slot, and a handle, on the outside of the last-named box extending through said slot for supporting said standard light.

10. An apparatus for measuring illumination of diffused light comprising a pair of photometer-screens at an angle with each other, one of which is freely exposed to diffused light striking it at various angles, a tubular lamp-box at the end of which the other screen is mounted and inclosed, an eye-tube whose axis bisects the angle between said screens, the latter being visible from the eye-tube, and an opaque screen bisecting the angle between said screens and located axially in said eye-tube.

11. An apparatus for measuring diffused illumination comprising a pair of photometer-screens at an angle with each other, and one of which is freely exposed to diffused light from various directions, a closed tubular lamp-box at the end of which the other screen is mounted, an eye-tube whose axis bisects the angle between said screens, the latter being visible from the opposite end of said eye-tube, an opaque screen axially mounted in said eye-tube, and separating said screens, a standard source of illumination longitudinally adjustable in said box, and a graduated scale adapted to measure directly in luces the amount of illumination of said second photometer-screen by the longitudinal adjustment of said source of illumination.

12. The combination with a screen freely exposed to light from different directions, of means for directly measuring, in luces, the amount of illumination, upon said screen, as distinguished from the intensity of light.

Signed this 12th day of November, 1902.

DOUGLASS BURNETT. [L. S.]

Witnesses:
   FREDERICK W. JESSER,
   JOHN C. BOYD.